(12) United States Patent
Takizawa et al.

(10) Patent No.: US 12,344,545 B2
(45) Date of Patent: Jul. 1, 2025

(54) METHOD FOR MANUFACTURING GLASS PLATE, METHOD FOR MANUFACTURING MAGNETIC-DISK GLASS SUBSTRATE, AND METHOD FOR MANUFACTURING MAGNETIC DISK

(71) Applicant: HOYA CORPORATION, Tokyo (JP)

(72) Inventors: Toshio Takizawa, Akishima (JP); Shuhei Azuma, Hung Yen Province (VN)

(73) Assignee: HOYA CORPORATION, Tokyo (JP)

( * ) Notice: Subject to any disclaimer, the term of this patent is extended or adjusted under 35 U.S.C. 154(b) by 323 days.

(21) Appl. No.: 17/636,855

(22) PCT Filed: Aug. 20, 2020

(86) PCT No.: PCT/JP2020/031536
§ 371 (c)(1),
(2) Date: Feb. 18, 2022

(87) PCT Pub. No.: WO2021/033758
PCT Pub. Date: Feb. 25, 2021

(65) Prior Publication Data
US 2022/0298053 A1    Sep. 22, 2022

(30) Foreign Application Priority Data

Aug. 20, 2019 (JP) ................................. 2019-150331

(51) Int. Cl.
C03B 29/02 (2006.01)
C03B 23/00 (2006.01)
C03B 23/02 (2006.01)
C03C 23/00 (2006.01)
(Continued)

(52) U.S. Cl.
CPC .......... *C03B 29/02* (2013.01); *C03B 23/0033* (2013.01); *C03B 23/02* (2013.01);
(Continued)

(58) Field of Classification Search
None
See application file for complete search history.

(56) References Cited

U.S. PATENT DOCUMENTS

2002/0108400 A1    8/2002   Watanabe et al.
2003/0096078 A1    5/2003   Horisaka et al.
(Continued)

FOREIGN PATENT DOCUMENTS

CN    207375951 U    5/2018
CN    108883961 A    11/2018
(Continued)

OTHER PUBLICATIONS

KR 20190024648 machine translation, Yahata Keisuke et al., A method for processing an end face of a glass substrate, Mar. 2019 (Year: 2019).*

(Continued)

*Primary Examiner* — Queenie S Dehghan
(74) *Attorney, Agent, or Firm* — Global IP Counselors, LLP (57) ABSTRACT

Chamfering processing for chamfering an edge face of a disk-shaped glass plate includes a step of disposing the glass plate such that a portion of the glass plate is disposed in a heating space for heating the glass plate and the remaining portion is disposed outside the heating space; and a step of softening a portion of the edge face of the glass plate by irradiating a circumferential portion of the edge face with a laser beam outside the heating space while rotating the glass plate in one direction around the center of the glass plate, and heating the softened portion of the edge face that has reached the heating space through the rotation.

10 Claims, 3 Drawing Sheets

(51) Int. Cl.
    *G11B 5/73*     (2006.01)
    *G11B 5/84*     (2006.01)
(52) U.S. Cl.
    CPC ...... *C03C 23/0025* (2013.01); *G11B 5/73921* (2019.05); *G11B 5/8404* (2013.01)

(56) References Cited

U.S. PATENT DOCUMENTS

| | | | |
|---|---|---|---|
| 2019/0151991 A1 | 5/2019 | Oogushi et al. | |
| 2021/0130219 A1 | 5/2021 | Oogushi et al. | |

FOREIGN PATENT DOCUMENTS

| | | |
|---|---|---|
| CN | 109514103 A | 3/2019 |
| JP | 2612332 B2 | 5/1997 |
| JP | 2002150546 A | 5/2002 |
| JP | 2010519164 A | 6/2010 |
| JP | 2016124757 A | 7/2016 |
| JP | 2017186202 A | 10/2017 |
| JP | 2017197414 A | 11/2017 |
| JP | 2018123013 A | 8/2018 |
| WO | 2017187675 A1 | 11/2017 |
| WO | 2018131182 A1 | 7/2018 |

OTHER PUBLICATIONS

WO 2020111282 machine translation, Azuma Shuhei, Method for manufacturing glass plate, Jun. 2020 (Year: 2020).*
International Search Report in PCT/JP2020/031536 dated Nov. 2, 2020.

* cited by examiner

METHOD FOR MANUFACTURING GLASS PLATE, METHOD FOR MANUFACTURING MAGNETIC-DISK GLASS SUBSTRATE, AND METHOD FOR MANUFACTURING MAGNETIC DISK

CROSS-REFERENCE TO RELATED APPLICATIONS

This is a U.S. National stage application of International Patent Application No. PCT/JP2020/031536, filed on Aug. 20, 2020, which claims priority to Japanese Patent Application No. 2019-150331 filed in Japan on Aug. 20, 2019. The entire contents of Japanese Patent Application No. 2019-150331 are hereby incorporated herein by reference.

BACKGROUND

Field of the Invention

The present invention relates to a method for manufacturing a glass plate including chamfering processing for chamfering an edge face of a glass plate, a method for manufacturing a magnetic-disk glass substrate, and a method for manufacturing a magnetic disk.

Background Information

A magnetic disk obtained by providing a magnetic film on a nonmagnetic glass substrate for an annular magnetic disk is used in a hard disk drive for recording data.

When a magnetic-disk glass substrate is manufactured, particles are likely to originate from an edge face of an annular glass plate that is the base of the magnetic-disk glass substrate that is to be a final product, and therefore it is preferable that the surfaces of edge faces of the annular glass plate are smoothened in order to inhibit fine particles from adhering to main surfaces of the annular glass plate, and from adversely affecting the performance of the magnetic disk. Also, it is preferable that edge faces of the glass plate have target shapes to realize precise fitting of a magnetic disk into an HDD device, and make an outer circumferential edge face of the glass substrate suitable to be held by a jig for holding the outer circumferential edge face when a magnetic film is formed on the main surfaces of the glass substrate.

A method of chamfering an edge of a glass plate using a laser beam is known as a method for making an edge face of a glass plate into a target shape. By irradiating the glass plate with a laser beam in a state where the entire glass member, which is a glass plate, is kept at a predetermined temperature that is higher than room temperature, such that an irradiation spot moves along a corner portion of the glass member over at least a portion of the entire length of the corner portion, at least a portion of the corner portion is heated to a temperature higher than that of the other portion, softened, and chamfered, for example (See, Japanese Patent No. 2612332).

SUMMARY

However, when an edge face of a glass plate is processed with a laser beam using the above-described method, a total of three steps are performed, the three steps being: a step of keeping the entire glass member at a predetermined temperature that is higher than room temperature, a step of irradiating a corner portion with the laser beam while moving the laser beam along a corner portion of the glass member, and a step of heating the entire chamfered glass with a heater and returning the temperature of the glass from a predetermined temperature to room temperature by gradually cooling the glass. Thus, the time it takes to perform chamfering increases, and the production efficiency of the glass plate decreases.

In view of this, the present invention aims to provide a method for manufacturing a glass plate including chamfering processing, a method for manufacturing a magnetic-disk glass substrate, and a method for manufacturing a magnetic disk with which when an edge face of a glass plate is made into a target shape by performing chamfering by irradiating the edge face of the glass plate with a laser beam, the production efficiency of the glass plate is improved, compared with a conventional method.

An aspect of the present invention is directed to a method for manufacturing a glass plate including chamfering processing for chamfering an edge face of a disk-shaped glass plate.

The chamfering processing includes: a step of disposing the glass plate such that a portion of the glass plate is disposed in a heating space for heating the glass plate and the remaining portion is disposed outside the heating space; and a step of softening a portion of the edge face of the glass plate by irradiating a circumferential portion of the edge face with a laser beam outside the heating space while rotating the glass plate in one direction around a center of the glass plate, and heating the softened portion of the edge face that has reached the heating space through the rotation.

It is preferable that the rotational speed of the glass plate around the center is lower than a rotational speed set value that is set according to a heating area of a main surface of the glass plate that is defined as a result of the main surface being disposed in the heating space.

It is preferable that $V < 1/50 \cdot A$ is satisfied where the rotational speed of the glass plate is V [mm/s] and the heating area is A [mm$^2$].

It is preferable that the glass plate has an average coefficient of linear thermal expansion of $100 \times 10^{-7}/°$ C. or less in a temperature range of 100° C. to 300° C.

It is preferable that an irradiation position where the edge face is irradiated with the laser beam is defined such that the softened portion of the edge face irradiated with the laser beam starts to enter the heating space before the temperature of the softened portion falls below a temperature that is lower than a strain temperature of the glass plate by 50° C.

It is preferable that a region of a main surface of the glass plate that is disposed in the heating space is more than or equal to half the area of the main surface of the glass plate.

It is preferable that the softened portion of the edge face is heated in the heating space at a temperature that is lower than a glass transition temperature of the glass plate.

It is preferable that the method includes a step of grinding or polishing a main surface of the glass plate without polishing the heated edge face. That is, it is preferable that the method includes a step of grinding or polishing the main surface of the glass plate while surface roughness of the edge face of the glass plate is kept at a surface roughness of the edge face obtained through the chamfering processing.

It is preferable that the glass plate is a blank of a magnetic-disk glass plate.

Another aspect of the present invention is directed to a method for manufacturing a magnetic-disk glass substrate, the method including grinding or polishing a main surface of the glass plate after the glass plate is manufactured using the method for manufacturing the glass plate.

Yet another aspect of the present invention is directed to a method for manufacturing a magnetic disk in which a magnetic film is formed on a main surface of a magnetic-disk glass substrate after the magnetic-disk glass substrate is manufactured using the method for manufacturing a magnetic-disk glass substrate.

Another aspect of the present invention is directed to a chamfering apparatus configured to chamfer an edge face of a disk-shaped glass plate. This chamfering apparatus includes a laser photoirradiation unit configured to irradiate the edge face of the glass plate with a laser beam, a heating unit that includes a heating space for heating the edge face that is irradiated with the laser beam, a movable platform configured to move a pedestal on which the glass plate is placed so as to move the glass plate in and out of the heating space, and a rotary motor configured to rotate the glass plate on the pedestal. A heat dissipation region of the edge face heated through the irradiation with the laser beam is provided between the laser irradiation position and a starting position where a softened portion thereof starts to enter the heating space.

According to the above-described method for manufacturing a glass plate, method for manufacturing a magnetic-disk glass substrate, and method for manufacturing a magnetic disk, when an edge face of the glass plate is made into a target shape by chamfering the edge face through irradiation with a laser beam, the production efficiency of the glass plate is improved, compared to a conventional method.

DETAILED DESCRIPTION OF THE EMBODIMENTS

The following describes a method for manufacturing a glass plate, a method for manufacturing a magnetic-disk glass substrate, and a method for manufacturing a magnetic disk according to an embodiment in detail.

Figure 1A:
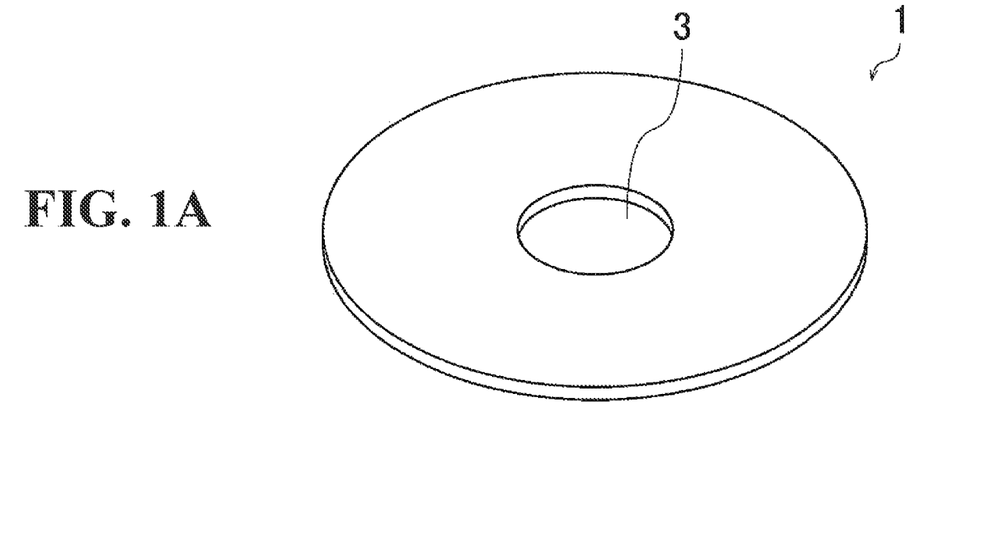
FIG. 1A is a perspective view of one example of a glass plate that is manufactured using a method for manufacturing a glass plate according to an embodiment.

A glass plate that is manufactured using a method for manufacturing a glass plate according to an embodiment is obtained by chamfering an edge face of a disk-shaped glass plate, and the glass plate is used as a magnetic-disk glass substrate, for example. FIG. 1A is a perspective view of one example of an annular glass plate that is manufactured using a method for manufacturing a glass plate according to an embodiment. The disk-shaped glass plate is a glass plate whose outer circumference has a circular shape. Also, the disk-shaped glass plate may be an annular glass plate having a circular hole concentric with the circular shape and having an inner circumference. Therefore, the disk shape also includes an annular shape.

A glass plate 1 shown in FIG. 1A is a thin annular glass plate having a circular hole 3 at the central portion thereof. The glass plate 1 can be used as a magnetic-disk glass substrate. If the glass plate 1 is to be used as a magnetic-disk glass substrate, there is no limitation on the size of the magnetic-disk glass substrate, and the magnetic-disk glass substrate has a nominal diameter of 2.5 inches or 3.5 inches, for example. In the case of a magnetic-disk glass substrate with a nominal diameter of 2.5 inches, the outer diameter thereof is in a range of 65 mm or 67 mm, the inner diameter of the circular hole is 20 mm, and the thickness thereof is in a range of 0.3 to 1.3 mm, for example. In the case of a magnetic-disk glass substrate with a nominal diameter of 3.5 inches, the outer diameter thereof is in a range of 85 to 100 mm, for example, the outer diameter thereof is 95 mm or 97 mm, the inner diameter of the circular hole is 25 mm, and the thickness thereof is in a range of 0.3 to 1.3 mm.

Figure 1B:
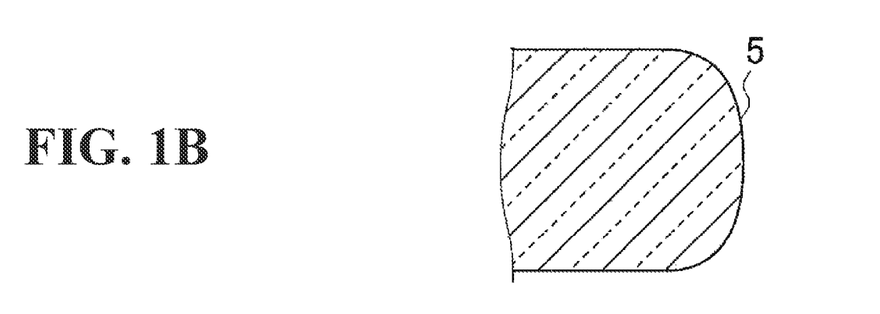
FIG. 1B is a diagram showing one example of a cross-sectional shape of a chamfered surface.

A chamfered surface is formed on a corner portion between an edge face and a main surface of the glass plate 1 shown in FIG. 1A by chamfering the edge face, FIG. 1B is a diagram showing one example of a cross-sectional shape of a chamfered surface. The cross-sectional shape refers to a shape obtained by cutting the glass plate 1 so as to pass through the central axis of the glass plate along the radial direction of the glass plate. As shown in FIG. 1B, the cross-sectional shape of a chamfered surface 5 forms a curved surface shape formed by a smooth curved line protruding outward in the radial direction. Note that, as another example of the cross-sectional shape shown in FIG. 1B, chamfered surfaces that are respectively connected to two main surfaces may each be formed into a curved shape, and a side wall surface that is present between the two chamfered surfaces may be formed into a linear shape that is orthogonal to the main surfaces or a slightly curved shape.

In the case of a magnetic-disk glass substrate, a magnetic disk is produced by grinding and polishing the main surfaces of the glass plate 1 and forming a magnetic layer on the main surfaces of the glass plate 1 as needed.

Figure 1C:
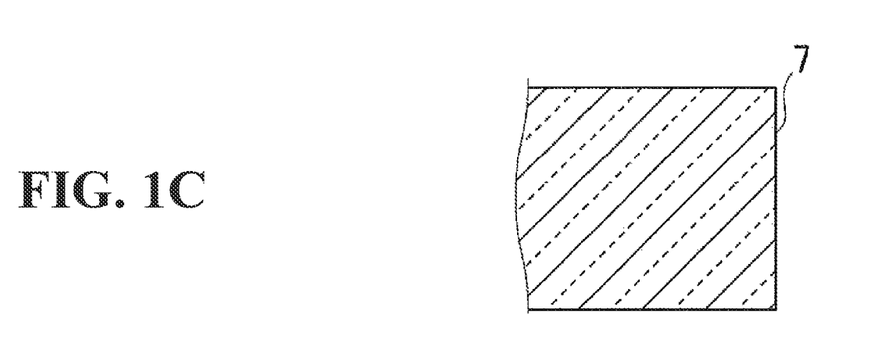
FIG. 1C is a diagram showing one example of the shape of an edge face of the glass plate before being subjected to chamfering processing.

FIG. 1C is a diagram showing one example of the shape of an edge face of a glass plate before being subjected to chamfering processing. An edge face 7 of the glass plate before being subjected to chamfering processing is a surface that is substantially orthogonal to the main surfaces of the glass plate. A chamfered surface 5 can be formed by irradiating such an edge face 7 with a laser beam, which will be described later. Note that the shape of the edge face 7 shown in FIG. 1C is one example and is not limited to a shape that is substantially orthogonal to the main surfaces, and may be a shape with slightly round corner portions, or a shape in which the corner portions thereof are inclined with respect to the main surfaces. It is preferable that a cross-sectional shape of the edge face 7 is substantially line-symmetric with respect to a line that represents half the thickness of the glass plate because the cross-sectional shape thereof obtained after the chamfered surface is formed is also likely to be substantially line-symmetric in a similar manner.

Figure 2A:
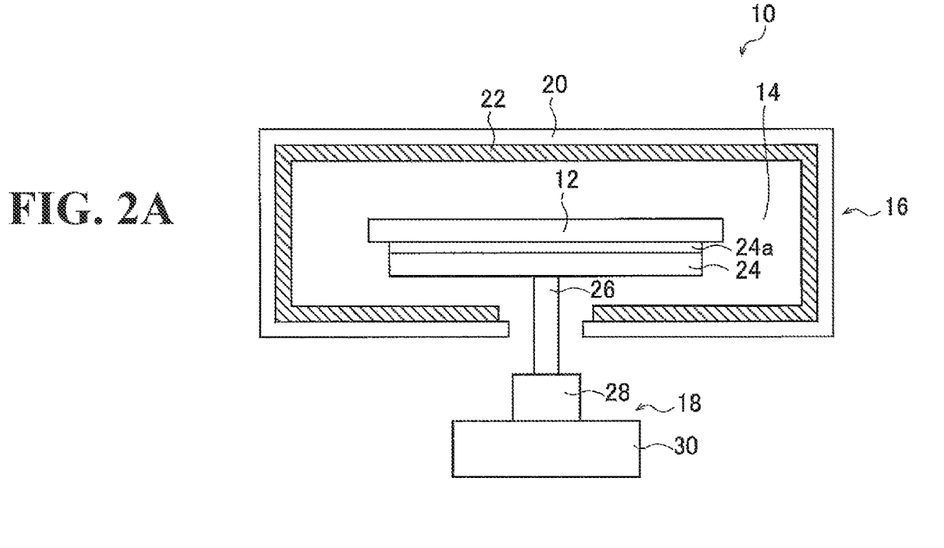
FIGS. 2A and 2B are diagrams illustrating one example of a chamfering apparatus that performs chamfering processing on an edge face of a disk-shaped glass plate in an embodiment.
Figure 2B:
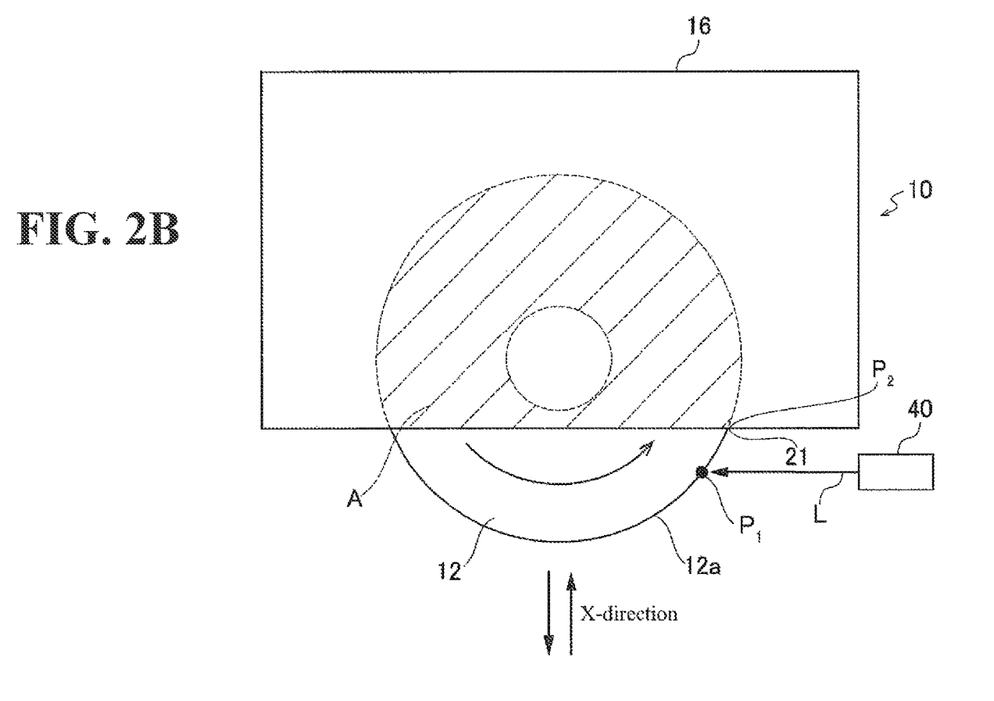

FIGS. 2A and 2B are diagrams illustrating one example of a chamfering apparatus 10 that performs chamfering processing on an edge face of an annular glass plate 12.

The chamfering apparatus 10 includes a heating unit 16 provided with a heating space 14 for heating a portion of the annular glass plate 12 before being subjected to chamfering processing, a drive unit 18 that move the glass plate 12 in and out of the heating space 14, and a laser irradiation unit 40.

The heating unit 16 includes a wall 20 that forms the heating space 14, and a portion of the wall 20 is open to form an opening portion 21 through which the glass plate 12 can be moved in and out. A heating heater 22 is provided substantially uniformly on an inner wall face of the wall 20 that is in contact with the heating space 14. The glass plate 12 in the heating space 14 is heated by heat generated by the heating heater 22. The size of the opening portion 21 is slightly larger than the size of the glass plate 12 such that heat inside the heating space 14 is unlikely to leak out.

The drive unit 18 includes a pedestal 24 on which the glass plate 12 is placed, a rotary motor 28 that rotates the glass plate 12 by rotating a rotary shaft 26 that is connected to the pedestal 4, and a movable platform 30 that can move the glass plate 12 in the X-direction (see FIG. 2B) so as to move in and out of the heating space 14.

The glass plate 12 is preferably placed on the pedestal 24 via a heat insulating member 24a. The heat insulating member 24a can suppress heat dissipation from the heated glass plate 12 to the rotary shaft 26, and thus the heating efficiency can be improved and the temperature distribution (temperature variation) depending on the position in the glass plate 12 can be reduced. Furthermore, the glass plate 12 is placed on the pedestal 24 such that the center position of the glass plate 12 substantially coincides with the position of the rotational center of the rotary shaft 26.

The laser irradiation unit 40 emits a laser beam L to a circumferential portion of an edge face 12a of the glass plate 12 located outside the heating space 14 such that the circumferential portion of the edge face 12a is softened. There is no particular limitation on the type of laser beam L as long as the irradiated portion is softened, and a $CO_2$ laser is suitably used, for example. There is no particular limitation on the oscillation form of the laser beam L, and any one of continuous oscillation light (CW light), pulse oscillation light, and light obtained by modulating continuous oscillation light may be used. If a $CO_2$ laser is used, the wavelength is preferably set to 3 μm or more. If the wavelength is shorter than 3 μm, glass is unlikely to absorb the laser beam L, and an outer circumferential edge face 28a and there may be cases where an inner circumferential edge face 28b of the annular glass plate 28 cannot be sufficiently heated. Also, if the wavelength is longer than 11 μm, it may be difficult to obtain such a laser device, and thus, the wavelength is more preferably 11 μm or less. Note that, in the case of a pulsed laser beam, for example, it is possible to use a laser beam having a repetition period of 5 kHz or more and a power density of 100 W/cm or less per pulse per unit area.

As shown in FIG. 2B, the glass plate 12 is irradiated with the laser beam L while the glass plate 12 is rotated. Thus, a portion of the edge face irradiated with the laser beam L dissipates heat until it enters the heating space 14, and then enters the heating space 14 where it is heated.

With the chamfering apparatus 10, the glass plate 12 is disposed such that a portion of the glass plate 12 is disposed inside the heating space 14, and the remaining portion is disposed outside the heating space 14. The chamfering apparatus 10 softens a portion of the edge face 12a by irradiating a circumferential portion of the edge face of the glass plate 12 with the laser beam L outside the heating space 14 while rotating the glass plate 12 in one direction around the center of the glass plate 12, and heats the softened portion of the edge portion 12a that has reached the heating space 14 through rotation. It is preferable that the entire edge face 12a of the glass plate 12 in the plate thickness direction of the glass plate 12 is irradiated with the laser beam L.

Irradiation of the edge face 12a with the laser beam L is completed by rotating the glass plate 12 once, for example. In this case, even though the irradiation of the edge face with the laser beam L has been completed, the glass plate 12 is continuously rotated until the heating of the portion, which has been softened through irradiation, in the heating space 14 is completed. Note that, as shown in FIG. 2B, if the inner hole is formed in the center of the glass plate 12 and the inner circumferential edge face is provided along the inner hole, the chamfered surface 5 can be formed by irradiating the inner circumferential edge face with the laser beam L in the same manner as for the outer circumferential edge face. It is also possible to process the inner circumferential edge face and the outer circumferential edge face simultaneously by irradiating the inner circumferential edge face and the outer circumferential edge face with different laser beams L simultaneously. Here, the outer circumferential edge face or the inner circumferential edge face may be irradiated with the laser beam L using a mirror or the like from a normal direction of the edge face to be irradiated, or may be inclined from the normal direction as appropriate. However, if the inclination from the normal direction is excessively large, most of the light may be reflected, the edge face 12a may not be sufficiently softened, and the chamfered surface may be poorly formed. Thus, it is preferable that the inclination angle from the normal direction of the edge face is within 60 degrees.

The glass of the edge face is softened by irradiating the edge face with the laser beam L in this manner, and a chamfered surface 5 having a curved surface shape such as that shown in FIG. 1B can be formed, for example. This can reduce the surface roughness of the chamfered edge face, and can set the arithmetic average roughness Ra (JIS B0601 2001) to 50 nm or less and/or Rz (JIS B0601 2001) to 500 nm or less, for example. Note that the arithmetic average roughness Ra is more preferably 30 nm or less, and even more preferably 10 nm or less. Also, the Rz is more preferably 300 nm or less, further preferably 100 nm or less, and even more preferably 50 nm or less.

However, due to the irradiation with the laser beam L, string-shaped glass pieces may peel off from the edge face 12a of the glass plate 12 along the circumferential direction of the glass plate 12, and thus there are cases where a large portion of the edge face 12a is shaved off. Also, there are cases where the obtained edge face from which glass pieces have peeled off has an abnormally high surface roughness. The mechanism by which glass pieces peel off can be assumed as follows. That is, due to irradiation with the laser beam L, glass in the vicinity of the surface of the edge face 12a of the glass is softened by locally heating the surface of the edge face 12a. However, the temperature difference between the glass in the vicinity of the surface of the end surface 12a irradiated with the laser beam L and the glass inside the glass plate 12 increases because the glass plate 12 has low thermal conductivity. After the irradiation with the laser beam L, the temperature of the vicinity of the surface of the edge face 12a of the glass decreases and the vicinity thereof hardens, and accordingly, thermal strain occurs due to the difference in thermal expansion between the glass in the vicinity of the surface of the edge face 12a of the glass plate 12 and the glass inside the glass plate 12. It is conceivable that, as a result, the glass in the vicinity of the surface of the edge face 12a and the glass inside the glass plate 12 start to separate from each other, and a portion of the glass in the vicinity of the surface of the edge face 12a separates from the glass plate 12, and the string-shaped glass pieces are formed. Formation of a string-shaped glass piece is referred to as the occurrence, of peeling.

If such peeling occurs, a large portion of the edge face 12a is shaved off, and thus the edge face 12a of the glass plate 12 cannot be formed into a curved surface shape such as that shown in FIG. 1B. Thus, while a portion of the edge face 12a of the glass plate 12 is softened by irradiating a circumferential portion of the edge face 12a with the laser beam L outside the heating space 14, the softened portion of the edge portion 12a that has reached the heating space 14 through rotation starts to be heated. As a result, it is possible to suppress the occurrence of peeling. It is conceivable that, in the heating space 14, the temperature difference between the glass in the vicinity of the surface of the softened edge face 12a and the glass inside the glass plate 12 decreases, and thermal strain, which occurs due to the difference in thermal expansion between the glass in the vicinity of the surface of the edge face 12a of the glass plate 12 and the glass inside the glass plate 12, can be suppressed.

Note that, if the glass plate 12 has a disk shape, it is possible to use rotation around the central axis, and thus it is particularly preferable to heat the remaining portion in the heating space 14 excluding the position irradiated with the laser beam L and a portion of the glass plate 12 that is present in the heat dissipation region until it is heated after being irradiated. Doing this makes it possible to soften the edge face through irradiation with the laser beam L and heat the edge face in the heating space 14 continuously and efficiently. In other words, in an embodiment, a portion of the glass plate 12 protrudes from the heating space doing so, a portion of the glass plate 12 constantly serves as a heat, dissipation region, and thus the glass plate 12 is not excessively heated. As a result, it is possible to shorten the cooling period of time after heating is performed and to improve productivity.

In the above-described chamfering processing for chamfering the edge face 12a of the glass plate 12 in this manner, the chamfered surface 5 can be formed by performing two processes: irradiation with the laser beam L, and the heating of the softened portion of the edge face 12a. Therefore, the time it takes to perform chamfering processing can be shortened and the production efficiency of the glass plate is increased, compared to a case where three processes of keeping the entire glass member at a predetermined temperature that is higher than room temperature, irradiating a corner portion of the glass member while moving the laser beam along the corner portion, and heating the entire chamfered glass with a heater and returning the temperature thereof from a predetermined temperature to room temperature through gradual cooling are performed as in a conventional method. Furthermore, because the formation of string-shaped glass pieces is suppressed, a large portion of the edge face 12a is not shaved off and surface roughness does not, abnormally increase, and thus it is possible to form the chamfered surface 5 with a desired shape.

Also, if chamfering is performed on each corner portion of a glass member as with a conventional method, the corner portions on both sides of the glass member in the plate thickness direction are each chamfered using one laser beam, and thus production efficiency further decreases. Also, if the corner portions on both sides of one given edge face are to be chamfered using two laser beams simultaneously, an apparatus needs to have a configuration in which two laser beams irradiate the corner portions simultaneously, which complicates the device configuration. In contrast, with this embodiment, the corner portions on both sides can be chamfered simultaneously by irradiating the entire edge face 12a in the plate thickness direction of the glass plate 12 with the laser beam L, and thus production efficiency is further improved and the device configuration is further simplified, compared with a conventional device configuration.

With the chamfering apparatus 10, the heat of the heated glass plate 12 dissipates from a region between the position irradiated with the laser beam L and a starting position where the softened portion starts to enter the heating space 14, and thus this region serves as a heat dissipation region. Also, the position irradiated with the laser beam is located outside the heating space 14 and is located in a non-heating region. Therefore, the edge face 12a is subjected to irradiation with the laser beam L heat dissipation, and heating in the non-heating region in the stated order.

In this manner, the chamfering apparatus 10 includes the laser photoirradiation unit 40 that irradiates the edge face 12a of the glass plate 12 with the laser beam L, the heating unit 16 provided with the heating space 14 for heating the edge face 12a that has been irradiated with the laser beam L, the movable platform 30 that moves the pedestal 24 on which the glass plate 12 is placed so as to move the glass plate 12 in and out of the heating space 14, and the rotary motor 28 that rotates the glass plate 12 on the pedestal 24. The heat dissipation region of the edge face 12a heated through the irradiation with the laser beam L is provided between the position irradiated with the laser beam L and the starting position where the softened portion starts to enter the heating space 14.

Figure 3:
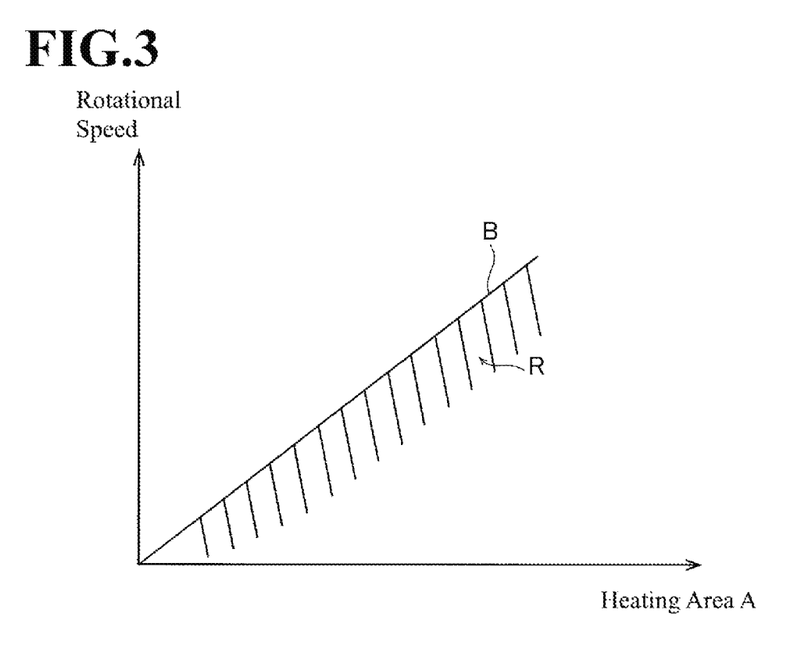
FIG. 3 is a diagram illustrating a relationship between a heating area and a preferable rotational speed of the glass plate in an embodiment.

According to an embodiment, if chamfering processing shown in FIGS. 2A and 2B is performed, in order to further reduce the occurrence of the above-described peeling, the rotational speed of the glass plate 12 around the center thereof (this refers to the moving speed of the edge face 12a of the glass plate 12 in the rotation direction) is preferably lower than the rotational speed set value that is set according to the heating area A of a main surface of the glass plate 12 defined by disposing the main surface of the glass plate 12 in the heating space 14 (the area of the shaded portion shown in FIG. 2B). FIG. 3 is a diagram illustrating the relationship between the heating area A and a preferable rotational speed of the glass plate 12. FIG. 3 shows changes in the rotational speed set value with respect to the heating area A, using a straight line B. The straight line B passes through the origin where the rotational speed is 0 when the heating area A is equal to 0. It is preferable that the rotational speed is set lower than the straight line B, that is, the rotational speed is set within the range of a region R in FIG. 3. In order to shorten the time it takes to perform chamfering processing and improve the production efficiency of the glass plate, the rotational speed of the glass plate 12 is preferably increased. However, if the rotational speed is excessively increased, glass inside the glass plate 12 will not be sufficiently heated with respect to that in the vicinity of the surface of the edge face 12a, and thus peeling is likely to occur. Thus, as shown in FIG. 3, the rotational speed set value, which is the upper limit of the rotational speed, is set according to the heating area A. Even if the rotational speed is increased within a region that is lower than the rotational speed set value, when the heating area A is large, it is possible to reduce the above-described temperature difference between the glass of the edge face of the glass plate 12 and the glass inside the glass plate 12 and the difference in thermal expansion therebetween, and it is also possible to reduce variation in the temperature of the heated glass plate 12 and to reliably reduce the occurrence of peeling. Furthermore, the total processing time for chamfering processing is shortened by increasing the rotational speed, and the production efficiency of the glass plate is improved. Therefore, a large heating area A is preferable.

According to an embodiment, it is preferable that $V<1/50 \cdot A$ is satisfied where the rotational speed of the glass plate 12 (the moving speed in the rotation direction of the edge face 12a of the glass plate 12) is V [mm/s] and the heating area is A [mm²]. According to an embodiment, the rotational speed set value is preferably $1/50 \cdot A$. Such $V<1/50 \cdot A$ can be set under the following conditions, for example. These conditions are normal conditions used when the edge face 12a is subjected to chamfering processing.

A laser beam with an output power of 18.29 W and a spot diameter of 1.23 mm is used, A glass plate 12 made of aluminosilicate glass, which is used as a magnetic-disk glass substrate and having a nominal diameter of 3.5 inches, is used, and The glass plate 12 is heated at a temperature, which is at least a temperature that is lower than the strain temperature of the glass plate 12 by 50° C. and is lower than a glass transition point temperature of the glass plate 12.

Note that, although there is no particular limitation on the lower limit value of the rotational speed V, from the viewpoint of improving productivity, the rotational speed V is preferably 10 mm is or more, and is more preferably 30 mm/s or more.

Note that the difference in thermal expansion between the edge face 12a of the glass plate 12 and the inside of the glass plate 12 is defined and the magnitude of the thermal strain thereof is defined by the linear expansion coefficient of the glass plate 12, and thus the average linear expansion coefficient of the glass plate 12 in a temperature range of 100° C. to 300° C. is preferably $100 \times 10^{-7}/°$ C. or less. If the average coefficient of linear thermal expansion of the glass plate 12 exceeds $100 \times 10^{-7}/°$ C., the effect of thermal strain caused by the temperature difference in the surface of the glass plate 12 is excessively increased, and thus flatness may deteriorate after chamfering processing is performed.

According to an embodiment, it is preferable that an irradiation position $P_1$ where the edge face is irradiated with the laser beam L is defined such that the softened portion of the edge face 12a starts to enter the heating space 14 before the temperature of the softened portion irradiated with the laser beam L falls below a temperature that is lower than the strain temperature of the glass plate 12 (the temperature where the glass viscosity reaches $10^{14.5}$ [dPa·s]) by 50° C. Accordingly, it is possible to efficiently alleviate thermal strain occurring between the edge face and the inside of the glass plate 12. It is preferable that the temperature of the softened portion when the softened portion starts to enter the heating space 14 is at least a temperature that is lower than the strain temperature by 50° C. and not more than a temperature that is higher than the strain temperature by 50° C. It is sufficient that the irradiation position $P_1$ is adjusted as appropriate based on the viewpoint, and a specific distance is preferably within 50 mm from the position $P_2$ at which the softened portion enters the heating space 14, for example. On the other hand, in order to provide a heat dissipation region of a certain size, the irradiation position $P_1$ is more preferably separated from the position $P_2$ by 5 mm or more.

According to an embodiment, if chamfering processing shown in FIGS. 2A and 2B is performed, the heating region A of the main surface of the glass plate 12 that is disposed in the heating space 14 is preferably more than or equal to half the area of the main surface of the glass plate 12. By setting the heating region A to be more than or equal to half the area of the main surface, it is possible to reduce variation in temperature when heating the glass plate 12 and reliably reduce the occurrence of peeling.

Note that the temperature at which the glass plate 12 is heated in the heating space 14 is preferably lower than the glass transition temperature of the glass plate 12. That is, the softened portion of the edge face 12a is preferably heated in the heating space 14 at a temperature that is lower than the glass transition temperature of the glass plate 12. If the heating temperature is the glass transition temperature or higher, the flatness of the glass plate 12 may deteriorate. Also, the heating temperature in the heating space 14 is preferably higher than or equal to a temperature that is lower than the strain temperature of the glass plate 12 by 50° C., for example. If the heating temperature is lower than the temperature that is lower than the strain temperature by 50° C., peeling may not be stably prevented.

Strain may remain in such a chamfered glass plate 12 due to the edge face 12a being locally heated. In this case, it is preferable to perform annealing after chamfering processing is performed. In the annealing processing, as an example, the temperature of the glass plate 12 is increased for several tens of minutes from room temperature (25° C.) to a temperature that is higher than the annealing temperature (the temperature at, which glass viscosity reaches $10^{13}$ [dPa·s]) by several tens of degrees Celsius or a temperature that is slightly lower than the glass transition point, the temperature of the glass plate 12 is kept at the temperature for several tens of minutes to 1 hour, the temperature thereof is gradually reduced to a temperature that is lower than the strain temperature by several tens of degrees Celsius for about 1 hour, and the glass plate 12 is then naturally cooled to room temperature. As a result, it is possible to set the retardation value of the glass plate 12 whose retardation value exceeds 5 [nm] due to remaining strain to an extremely low value of 5 [nm] or less. According to studies conducted by the inventors of the present invention, by performing annealing processing on the glass plate 12 whose retardation value is already a low value of 6.25 [nm], it is possible to set the retardation value to a lower value of 1.08 [nm], for example.

Although there is no particular limitation on the manufacture of a glass plate that is subjected to chamfering processing in this manner, the glass plate can be manufactured using a float method, a downdraw method, or a pressing method, for example. A plurality of disk-shaped glass plates each provided with an inner hole can be obtained from a large glass sheet manufactured using a float method or a downdraw method. In a method for obtaining disk-shaped glass plates from a large glass sheet, disk-shaped glass plates may be obtained through cutting using a well-known scriber, or by irradiating the glass plates with a laser beam to form a circular defect, and cutting out annular shaped glass plates.

If a magnetic-disk glass plate is to be manufactured from the chamfered glass plate, various processes are performed such that the glass plate has properties suitable for a magnetic-disk glass plate, which will be a final product. Hereinafter, a description will be given using the glass plate 12.

The main surfaces of the chamfered glass plate 12 are ground and polished.

In grinding and polishing processing, the glass plate 12 is ground and then polished.

In grinding processing, a double-side grinding apparatus provided with a planetary gear mechanism is used to grind the main surfaces of the glass plate 12. Specifically, the main surfaces on both sides of the glass plate 12 are ground while the outer circumferential edge face of the glass plate 12 is held in a holding hole provided in a holding member of the double-side grinding apparatus. The double-side grinding apparatus has a pair of upper and lower surface plates (an upper surface plate and a lower surface plate), and the glass plate 12 is held between the upper surface plate and the lower surface plate. Then, it is possible to grind the two main surfaces of the glass plate 12 by moving the glass plate 12 and the surface plates relative to each other while moving one or both of the upper surface plate and the lower surface plate and supplying a coolant. Grinding members obtained by forming fixed abrasive particles in which diamonds are fixed in resin into a sheet shape may be mounted on the surface plates, and then grinding processing may be performed, for example.

Then, first polishing is performed on the main surfaces of the ground glass plate 12. Specifically, the main surfaces on both sides of the glass plate 12 are polished while the outer circumferential edge face of the glass plate 12 is held in a holding hole provided in a polishing carrier of the double-side polishing apparatus. The first polishing is performed in order to remove blemishes and strain remaining on the ground main surfaces or adjust minute unevenness (micro-waviness and roughness) remaining on the surfaces.

In the first polishing processing, the glass plate 12 is polished using a double-side polishing apparatus having a configuration similar to that of the above-described double-side grinding apparatus that is used in the grinding processing using fixed abrasive particles, while a polishing slurry is provided. In the first polishing processing, a polishing slurry containing loose abrasive particles is used. Cerium oxide abrasive particles, zirconia abrasive particles, or the like are used as loose abrasive particles used in the first polishing, for example. Similar to the double-side grinding apparatus, the glass plate 12 is also held between the upper surface plate and the lower surface plate in the double-side polishing apparatus. Tabular polishing pads (resin polishers, for example) having an overall annular shape are attached to the upper surface of the lower surface plate and the bottom surface of the upper surface plate. The glass plate 12 and the surface plates are moved relative to each other by moving one or both of the upper surface plate and the lower surface plate, and thus the two main surfaces of the glass plate 12 are polished. The size of the polishing abrasive particles is preferably in a range of 0.5 to 3 µm in terms of an average particle diameter (D50).

The glass plate 12 may be chemically strengthened after the first polishing in this case, a melt in which potassium nitrate and sodium nitrate are mixed, for example, can be used as the chemical strengthening liquid, and the glass plate 12 is immersed in the chemical strengthening liquid. Accordingly, it is possible to form a compressive stress layer on the surface of the glass plate 12 through ion exchange.

Then, the second polishing is performed on the glass plate 12. The second polishing processing is performed in order to mirror-polish the main surfaces. A double-side polishing apparatus having a configuration that is similar to that of the double-side polishing apparatus used in the first polishing is used in the second polishing as well, Specifically, the main surfaces on both sides of the glass plate 12 are polished while the outer circumferential edge face of the glass plate 12 is held in a holding hole provided in a polishing carrier of the double-side polishing apparatus. The second polishing processing differs from the first polishing processing in that the type and particle size of loose abrasive particles are different, and the hardness of the resin polishers is also different. It is preferable that the hardness of the resin polisher is lower than that in the first polishing processing. A polishing liquid containing silica as loose abrasive particles is supplied between the polishing pads of the double-side polishing apparatus and the main surfaces of the glass plate 12, and the main surfaces of the glass plate 12 are polished, for example. The size of the polishing abrasive particles used in the second polishing is preferably in a range of 5 to 50 nm in terms of an average particle diameter (d50).

Whether or not chemical strengthening processing is to be carried out need only be selected as appropriate in consideration of the composition of the glass and how necessary chemical strengthening processing may be therefor. Other polishing processing may also be performed in addition to the first polishing processing and the second polishing processing, or processing for polishing two main surfaces may be completed through a single polishing process. Also, the order of the processes may be changed as appropriate.

A magnetic-disk glass substrate that satisfies the conditions required for a glass plate for a magnetic disk is manufactured by manufacturing a glass plate 12 whose edge face is chamfered by irradiating the edge face with the above-described laser beam, and gritting or polishing the main surface of the glass plate 12 in this manner.

Thereafter, a magnetic disk can be manufactured by forming at least a magnetic film on a main surface of the magnetic-disk glass substrate.

Note that edge face polishing processing for polishing the edge face 12a of the glass plate 12 may be performed before first polishing is performed on the glass plate 12, for example, after first grinding and before first polishing, or before first grinding.

Even if such edge face polishing processing is performed, the arithmetic average roughness Ra of the edge face of the glass plate 12 that has been subjected to chamfering processing through irradiation with the laser beam L in advance can be set to 50 nm or less and/or Rz thereof to 500 nm or less, and thus the time it takes to perform edge face polishing processing can be shortened.

The edge face polishing processing may be performed using a polishing blush method in which polishing is performed using a polishing blush while loose abrasive particles are supplied to the edge face, or a polishing method in which a magnetic functional fluid is used. The polishing method in which a magnetic functional fluid is used is a method for polishing the edge face 12a by agglomerating, using a magnetic field, a slurry in which a magnetorheological fluid contains polishing abrasive particles, inserting the edge face 12a of the glass plate 12 into the agglomerated slurry, and rotating the agglomerated slurry and the glass substrate relative to each other. However, in order to increase production efficiency, it is preferable that edge face polishing processing is not performed. It is preferable to grind or polish the main surfaces of the glass plate 12 while the surface roughness of the edge face 12a of the glass plate 12 is kept at the surface roughness of the edge face 12a obtained through chamfering processing. Note that it may be said that chamfering processing also serves as the edge face polishing processing because the chamfered surface formed in the chamfering processing performed in this embodiment has low surface roughness. In this case, it is preferable that additional edge face polishing processing is not performed, in addition to the edge face polishing performed simultaneously with the chamfering processing.

The glass transition temperature Tg of the glass plate 12 is preferably 450° C. to 800° C., and more preferably 480° C. to 750° C.

It is possible to use amorphous glass such as aluminosilicate glass, soda lime glass, or borosilicate glass as the material of glass of the glass plate 12. If a magnetic-disk glass substrate is to be produced, it is possible to suitably use aluminosilicate glass with which a magnetic-disk glass substrate on which chemical strengthening can be performed, and whose main surfaces are highly flat, and that has high substrate strength can be obtained.

Although there is no limitation on the glass composition of the glass plate 12, according to an embodiment, the glass plate 12 is preferably made of amorphous aluminosilicate glass having a composition containing, in terms of oxide amount in mol %, $SiO_2$ in an amount of 50 mol % to 75 mol %, $Al_2O_3$ in an amount of 1 mol % to 15 mol %, and at least one selected from $Li_2O$, $Na_2O$, and $K_2O$ in a total amount of 5 mol % to 35 mol %, at least one selected from MgO, CaO, SrO, BaO, and ZnO in a total amount of 0 mol % to 20 mol %, and at least one selected from $ZrO_2$, $TiO_2$, $La_2O_3$, $Y_2O_3$, $Ta_2O_5$, $Nb_2O_5$, and $HfO_2$ in a total amount of 0 mol % to 10 mol %.

Also, according to an embodiment, the glass plate 12 is made of amorphous aluminosilicate glass having a composition containing, in mass %, $SiO_2$ in an amount of 57 mass % to 75 mass %, $Al_2O_3$ in an amount of 5 mass % to 20 mass % (note that the total amount of $SiO_2$ and $Al_2O_3$ is 74 mass % or more), $ZrO_2$, $WO_2$, $Nb_2O_5$, $Ta_2O_5$, $La_2O_3$, $Y_2O_3$, and $TiO_2$ in a total amount of more than 0 mass % and 6 mass % or less, $Li_2O$ in an amount of more than 1 mass % and 9 mass % or less, $Na_2O$ in an amount of 5 mass % to 28 mass % (note that the mass ratio $Li_2O/Na_2O$ is 0.5 or less), $K_2O$ in an amount of 0 mass % to 6 mass %, MgO in an amount of 0 mass % to 4 mass %, CaO in an amount of more than 0 mass % and 5 mass % or less (note that the total amount of MgO and CaO is 5 mass % or less and the CaO content is higher than the MgO content), and SrO+BaO in an amount of 0 mass % to 3 mass %.

Furthermore, according to an embodiment, the glass plate 12 may contain, as essential components, $SiO_2$, $Li_2O$, $Na_2O$, and one or more alkaline earth metal oxides selected from the group consisting of MgO, CaO, SrO, and BaO, and the mole ratio of the CaO content relative to the total content of MgO, CaO, SrO, and BaO (CaO/(MgO+CaO+SrO+BaO)) may be 0.20 or less, and the glass transition temperature Tg thereof may be 650° C. or higher. If glass with such a composition is used for a magnetic-disk glass substrate, it is suitable for a magnetic-disk glass substrate that is used as a magnetic disk for energy-assisted magnetic recording.

EXPERIMENTAL EXAMPLES

In order to confirm effects of the method for manufacturing a glass plate according to this embodiment, chamfering processing was performed using an annular glass plate 12 (having an outer diameter of 95 mm, an inner diameter of 25 mm, and a plate thickness of 0.7 mm) with various heating areas A (excluding the portion of the circular hole 3) at various rotational speed V, and whether or not peeling occurred was evaluated. The edge face of the glass plate 12 before being subjected to chamfering processing was an edge face 7 that is perpendicular to the main surfaces as shown in FIG. 1C. The glass of the glass plate 12 was amorphous aluminosilicate glass having a glass transition temperature of 500° C., a strain temperature of 450° C., and an average coefficient of linear thermal expansion of $95 \times 10^{-7}$ at 100° C. to 300° C.

The laser irradiation unit 40 was disposed at a position such as that shown in FIG. 2B with respect to the outer circumferential edge face of the glass plate 12, and as shown in FIG. 2B, the outer circumferential edge face was irradiated with the laser beam L. The heating temperature in the heating space 14 was adjusted to 480° C. The irradiation position $P_1$ irradiated with the laser beam L was located 25 mm away from the position $P_2$ in the circumferential direction of the glass plate 12. Also, the angle at which the laser beam L is incident on the edge face was set to an angle inclined by 45 degrees from the normal direction of the edge face in the in-plane direction of the main surfaces.

Table 1 below shows the results of evaluation obtained when chamfering processing was performed under the conditions 1 to 26.

TABLE 1

| | Heating Area A [mm$^2$] | Rotational Speed V [mm/s] | $\frac{1}{50}$ · A | Presence/Absence of Peeling |
|---|---|---|---|---|
| Condition 1 | 0 | 2 | 0 | Yes |
| Condition 2 | 0 | 10 | 0 | Yes |
| Condition 3 | 500 | 5 | 10 | No |
| Condition 4 | 500 | 10 | 10 | Yes |
| Condition 5 | 500 | 15 | 10 | Yes |
| Condition 6 | 1000 | 5 | 20 | No |
| Condition 7 | 1000 | 10 | 20 | No |
| Condition 8 | 1000 | 20 | 20 | Yes |
| Condition 9 | 1000 | 30 | 20 | Yes |
| Condition 10 | 2000 | 30 | 40 | No |
| Condition 11 | 2000 | 40 | 40 | Yes |
| Condition 12 | 2000 | 50 | 40 | Yes |
| Condition 13 | 3000 | 25 | 60 | No |
| Condition 14 | 3000 | 50 | 60 | No |
| Condition 15 | 3000 | 60 | 60 | Yes |
| Condition 16 | 3000 | 70 | 60 | Yes |
| Condition 17 | 4000 | 70 | 80 | No |
| Condition 18 | 4000 | 80 | 80 | Yes |
| Condition 19 | 4000 | 90 | 80 | Yes |
| Condition 20 | 5000 | 45 | 100 | No |
| Condition 21 | 5000 | 90 | 100 | No |
| Condition 22 | 5000 | 100 | 100 | Yes |
| Condition 23 | 5000 | 110 | 100 | Yes |
| Condition 24 | 5500 | 100 | 110 | No |
| Condition 25 | 5500 | 110 | 110 | Yes |
| Condition 26 | 5500 | 120 | 110 | Yes |

Note that it is not preferable to introduce the entire glass plate 12 into the heating space 14 because it takes time to cool the glass plate 12, and production efficiency is severely reduced, and thus this case was not included in the conditions.

According to the results of evaluation performed under the conditions 1 to 26, no peeling was observed as a result of V<1.50·A being satisfied. All of the edge faces of the glass plates 12 in which no peeling occurred had a cross-sectional shape similar to the shape shown in FIG. 1B, and were provided with chamfered surfaces. Also, the surface roughness of each edge face had an arithmetic average roughness Ra, of 50 nm or less.

Based on this, it can be seen that it is preferable to satisfy V<$\frac{1}{50}$·A from the viewpoint of preventing the occurrence of peeling.

As described above, although a method for manufacturing a glass plate, a method for manufacturing a magnetic-disk glass substrate, and a method for manufacturing a magnetic disk according to the present invention have been described in detail, the present invention is not limited to the embodiment, and it will be appreciated that various improvements and modifications can be made without departing from the gist of the present invention.

The invention claimed is:

1. A method for manufacturing a glass plate, the method comprising:
chamfering processing for chamfering an edge face of a disk-shaped glass plate,
the chamfering processing including,
disposing the glass plate such that a portion of the glass plate is disposed in a heating space for heating the glass plate and the remaining portion is disposed outside the heating space, and
softening a portion of the edge face of the glass plate by irradiating a circumferential portion of the edge face with a laser beam outside the heating space while rotating the glass plate in one direction around a center of the glass plate, and heating the softened portion of the edge face that has reached the heating space through the rotation,
wherein a region of a main surface of the glass plate that is disposed in the heating space is more than or equal to half the area of the main surface of the glass plate.

2. The method for manufacturing a glass plate according to claim 1,
wherein the rotational speed of the glass plate around the center is lower than a rotational speed set value that is set according to a heating area of the main surface of the glass plate that is defined as a result of the main surface being disposed in the heating space.

3. The method for manufacturing a glass plate according to claim 2,
wherein $V < 1/50 \cdot A$ is satisfied where the rotational speed of the glass plate is V [mm/s] and the heating area is A [mm$^2$].

4. The method for manufacturing a glass plate according to claim 1,
wherein the glass plate has an average coefficient of linear thermal expansion of $100 \times 10^{-7}/°$ C. or less in a temperature range of 100° C. to 300° C.

5. The method for manufacturing a glass plate according to claim 1,
wherein an irradiation position where the edge face is irradiated with the laser beam is defined such that the softened portion of the edge face irradiated with the laser beam starts to enter the heating space before the temperature of the softened portion falls below a temperature that is lower than a strain temperature of the glass plate by 50° C.

6. The method for manufacturing a glass plate according to claim 1,
wherein the softened portion of the edge face is heated in the heating space at a temperature that is lower than a glass transition temperature of the glass plate.

7. The method for manufacturing a glass plate according to claim 1, further comprising
grinding or polishing the main surface of the glass plate without polishing the heated edge face.

8. The method for manufacturing a glass plate according to claim 1,
wherein the glass plate is a blank of a magnetic-disk glass plate.

9. A method for manufacturing a magnetic-disk glass substrate, comprising
grinding or polishing the main surface of the glass plate after the glass plate is manufactured using the method for manufacturing a glass plate according to claim 8.

10. A method for manufacturing a magnetic disk,
wherein a magnetic film is formed on a main surface of a magnetic-disk glass substrate after the magnetic-disk glass substrate is manufactured using the method for manufacturing a magnetic-disk glass substrate according to claim 9.

* * * * *